Figure 1:
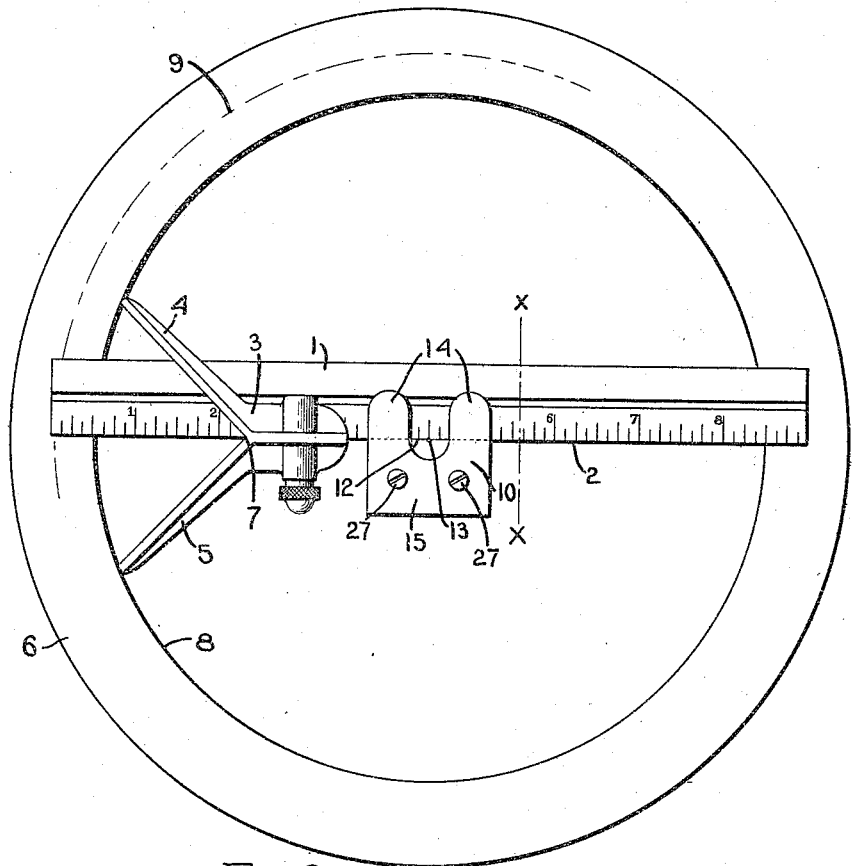

P. ABBOTT.
CENTER FINDER FOR CENTER SQUARES.
APPLICATION FILED SEPT. 25, 1914.

1,153,149.

Patented Sept. 7, 1915.

Witnesses.
J. Morrill Fuller
William E. Gagen

Inventor.
Peter Abbott
by Heard Smith & Tennant.
Att'ys

UNITED STATES PATENT OFFICE.

PETER ABBOTT, OF FRANKLIN, NEW HAMPSHIRE.

CENTER-FINDER FOR CENTER-SQUARES.

1,153,149.  Specification of Letters Patent.  Patented Sept. 7, 1915.

Application filed September 25, 1914. Serial No. 863,541.

*To all whom it may concern:*

Be it known that I, PETER ABBOTT, a citizen of the United States, residing at Franklin, county of Merrimack, State of New Hampshire, have invented an Improvement in Center-Finders for Center-Squares, of which the following description, in connection with the accompanying drawing, is a specification, like characters on the drawing representing like parts.

This invention relates to center squares and has for its object to provide a center square with a center finder member by which when the center square is applied to an annular object the center of said object can be readily found and a centering support will be provided at the center of the object for receiving one leg of a pair of dividers, compasses or other similar instrument.

In order to give an understanding of my invention I have illustrated herein some selected embodiments thereof which will now be described after which the novel features of the invention will be pointed out in the appended claims.

Figure 2:
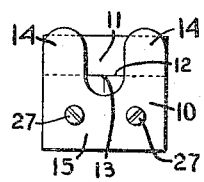
Figure 3:
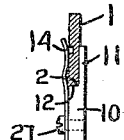
Figure 4:
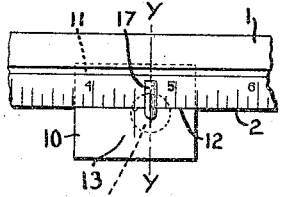
Figure 5:
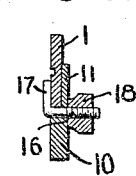
Figure 6:
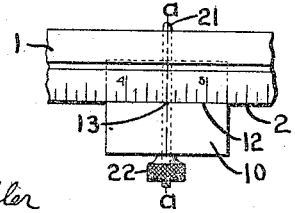
Figure 7:
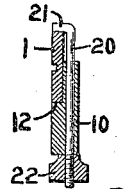

In the drawings, Figure 1 is a general view showing a center square having my improvements applied to an annular object; Fig. 2 is a plan view of the centering member; Fig. 3 is a section on the line $x$—$x$, Fig. 1; Fig. 4 shows a modified form of the invention; Fig. 5 is a section on the line $y$—$y$, Fig. 4; Fig. 6 shows still another embodiment of the invention; Fig. 7 is a section on the line $a$—$a$, Fig. 6.

I have shown in the drawings an ordinary center square comprising the rule member 1 herein illustrated as having its edge 2 graduated in inches or other units of measurement, and a centering head or member 3 carried by the rule member and provided with the two divergent arms 4 and 5 which are adapted to engage the circular wall of an annular object, such as the ring 6, the angle 7 between the legs 4 and 5 being in line with the graduated edge 2 of the rule member. The above-described construction is that of an ordinary center square and it is used by placing it on an annular object 6 with the ends of the legs 4 and 5 engaging the inner wall 8 of the annular object, the construction being such that when the instrument is thus placed on the annular object the graduated edge 2 of the rule 1 will extend diametrically of the object.

In machining or working on annular pieces of metal it is often desirable to be able to draw or mark on the face of the object a curved line, such as the dot and dash line 9, which shall be drawn on the arc of a circle having the center of the member 6 as its center. In order to enable this to be done I have provided a center square having a center finding member which is adjustable longitudinally of the rule member and is provided with a centering notch adjacent the edge 2, which notch is adapted to receive one leg of a pair of dividers, compasses or other similar instrument, and form a center about which the instrument may be operated. This centering member is shown at 10, and in the preferred embodiment of my invention it comprises a body portion having a flange or extension 11 that sets under the rule 1, and a shoulder 12 that fits against the edge 2. This shoulder 12 is provided with a centering notch 13 adapted to receive one leg of a pair of dividers or similar instrument. This centering member may be adjustably held to the rule member 1 in various ways without departing from the invention.

In Figs. 1, 2 and 3 I have shown for this purpose two spring fingers 14 which extend from a plate 15 that is secured to the upper side of the member 10 by means of screws 27, said fingers 14 overlying the upper side of the rule 1, thus holding the body 10 in position while permitting it to slide longitudinally. The centering notch 13 is accessible between the fingers 14.

In Figs. 4 and 5 I have shown another embodiment of the invention wherein the member 10 is held in position by means of a clamping screw 16 that extends through the body 10 and is provided with the arm or head 17 that overlies the upper face of the scale 1. This clamping screw 16 is provided with a screw-threaded portion with which a clamping nut 18 has engagement. By loosening the nut 18 the member 10 can be adjusted longitudinally of the rule member 1 to bring the centering notch 13 at the center of the article 6, and the member 10 may be held in this adjusted position by merely tightening the nut 18.

In Figs. 6 and 7 a slightly different embodiment of the invention is shown wherein the member 10 is held in position by the clamping member 20 that extends through the member 10 from one edge to the other and is provided with a lip 21 to engage the back side of the rule 1, said clamping member 20 having a clamping nut 22 thereon. In this embodiment the clamping member operates to clamp the rule against the shoulder 12 of the center member.

In using the device the center square is applied to the object 6, as shown in Fig. 1, in usual manner, and after determining the diametrical dimension of the object by means of the graduated rule member the centering member 10 is adjusted longitudinally of the rule member to bring the notch 13 at the exact center of the annular member 6, and if the construction shown in Figs. 4, 5, 6 and 7 is employed, then the clamping member will be set to firmly clamp the centering member in position. When the centering member has been positioned, then one leg of a pair of dividers or similar instrument may be inserted in the centering notch 13, and an arc 9 may be struck at the desired distance from the center. This member 10 furnishes a firm support for the dividers or similar instrument, and my improvement enables a workman to rapidly and accurately draw arcs of circles on an annular member 6.

While I have illustrated some selected embodiments of my invention I do not wish to be limited to the constructional features shown.

I claim:

1. In a center finder for center squares, the combination with a center square having a rule member provided with a graduated edge and centering means carried thereby and by which said graduated edge can be positioned diametrically, of a center block slidably mounted on the rule member and having an edge which slidably engages the graduated edge of the rule member and which is provided with an instrument-centering notch.

2. In a device of the class described, the combination with a center square having a rule member and centering means carried thereby, of a center block slidably mounted on the rule member and provided with an instrument-centering notch.

In testimony whereof, I have signed my name to this specification, in the presence of two subscribing witnesses.

PETER ABBOTT.

Witnesses:
GEO. E. ABBOTT,
FRANK E. WOODBURY.

Copies of this patent may be obtained for five cents each, by addressing the "Commissioner of Patents, Washington, D. C."